(12) United States Patent
Moteki et al.

(10) Patent No.: US 6,708,234 B2
(45) Date of Patent: Mar. 16, 2004

(54) DATA PROCESSING APPARATUS AND DMA DATA TRANSFER METHOD

(75) Inventors: Kiyotaka Moteki, Tachikawa (JP);
Norio Michiie, Shinagawa-ku (JP);
Yasuhiro Hattori, Yokohama (JP);
Hiromitsu Shimizu, Ohta-ku (JP);
Takao Okamura, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 274 days.

(21) Appl. No.: 09/964,464

(22) Filed: Sep. 28, 2001

(65) Prior Publication Data

US 2002/0040415 A1 Apr. 4, 2002

(30) Foreign Application Priority Data

Sep. 29, 2000 (JP) .................................. 2000-300622
Oct. 31, 2000 (JP) .................................. 2000-332035
Oct. 31, 2000 (JP) .................................. 2000-332744

(51) Int. Cl.[7] .............................. G06F 13/28; H04N 5/44
(52) U.S. Cl. .............................. 710/22; 710/23; 710/26; 358/444
(58) Field of Search .............................. 710/22, 23, 26, 710/260; 358/444, 1.16, 1.17

(56) References Cited

U.S. PATENT DOCUMENTS

| 4,805,348 A | 2/1989 | Arai et al. |
| 5,099,614 A | 3/1992 | Arai et al. |
| 5,294,944 A | 3/1994 | Takeyama et al. |
| 5,329,732 A | 7/1994 | Karlsrud et al. |
| 5,432,537 A | 7/1995 | Imakawa et al. |
| 5,498,196 A | 3/1996 | Karlsrud et al. |
| 5,498,199 A | 3/1996 | Karlsrud et al. |
| 5,610,651 A | 3/1997 | Yamakawa et al. |
| 5,987,227 A | 11/1999 | Endo et al. |
| 6,092,116 A | 7/2000 | Earnest et al. |
| 6,145,016 A * | 11/2000 | Lai et al. ..................... 710/4 |
| 6,226,102 B1 | 5/2001 | Koike et al. |
| 6,324,597 B2 * | 11/2001 | Collier ..................... 710/22 |
| 6,330,623 B1 * | 12/2001 | Wu et al. ..................... 710/23 |
| 6,449,064 B1 | 9/2002 | Hattori et al. |

FOREIGN PATENT DOCUMENTS

| JP | 6-103225 | 4/1994 |
| WO | WO 00/31649 | 6/2000 |

* cited by examiner

Primary Examiner—Rehana Perveen
(74) Attorney, Agent, or Firm—Oblon, Spivak, McClelland, Maier & Neustadt, P.C.

(57) ABSTRACT

In a data processing apparatus, an image memory has a descriptor region and an image region, the image region storing a plurality of blocks of image data, the descriptor region storing a corresponding number of descriptor information blocks for the plurality of image data blocks. A DMA controller controls DMA data transfer of the image data blocks from the image region according to each descriptor information block in the descriptor region. The DMA controller comprises a register which stores one of the descriptor information blocks from the descriptor region of the image memory, and a control unit which determines, at a time of occurrence of a CPU interrupt, a start timing of a DMA data output operation of the DMA controller during a DMA data input operation of the DMA controller when an image editing request contained in input image data is received, the CPU interrupt being caused to occur by an interrupt request bit of the descriptor information block read from the register.

17 Claims, 12 Drawing Sheets

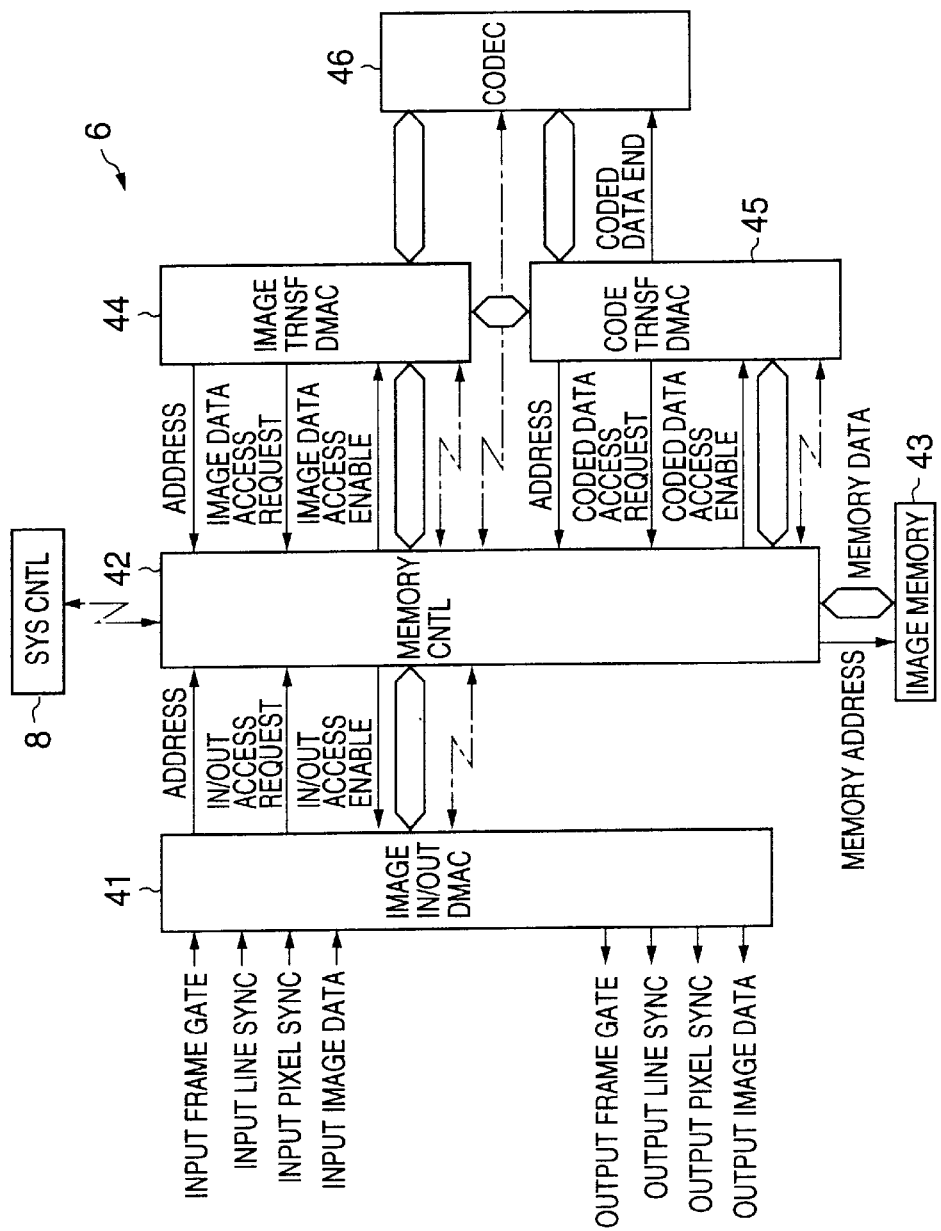

| 54 | CHAIN ADDRESS |
|---|---|
| 55 | DATA STORING ADDRESS |
| 56 | DATA TRNSF LINE NO. |
| 57 | FORMAT DATA |

DATA PROCESSING APPARATUS AND DMA DATA TRANSFER METHOD

BACKGROUND OF THE INVENTION

1. Field of the Invention

The present invention relates to a data processing apparatus having a DMA (direct memory access) controller which controls the DMA data transfer to the image memory according to descriptor information, and a DMA data transfer method for use in the data processing apparatus.

2. Description of the Related Art

With recent developments of digital technology, the digital image forming systems, such as copiers, facsimiles, printers and scanners, wherein the image forming is executed by the digital method become widespread. In such digital image forming systems, the image memory is utilized to perform image data processing or editing. For example, the function of electronic sorting is known, and, when performing this function, while multiple images are stored in the image memory, the image forming operation is performed for the stored images. Conventionally, in order to maximize the utilization of the image memory and reduce the cost thereof, the following measures are taken.

1) The image memory is constituted by a semiconductor memory and a secondary storage device, such as a hard disk, the semiconductor memory storing control data to control the image forming system, and the secondary storage device storing the image data.

2) A semiconductor memory is used to store the image data, and, to reduce the amount of the storage, the image data is compressed, and the compressed image data is stored in the semiconductor memory.

3) A plurality of image input/output devices, such as an image scanner, a printer controller, a file server and a facsimile controller, share the same image memory to store the image data.

On the other hand, Japanese Laid-Open Patent Application No. 6-103225 discloses a DMA (direct memory access) controller which controls DMA data transfer to a memory device according to descriptor information.

If the conventional DMA controller of the above document is applied to an image forming system, the DMA controller controls the image data transfer to a region of the image memory of the image forming system according to descriptor information. Also, the image memory may be used in the form of a ring buffer. The descriptor information is a control data used for management of the image memory region. The image memory is divided into plural image regions, and a plurality of descriptors are allocated to control the DMA data transfer to the respective image regions of the image memory.

However, when executing an image editing function, such as centering or white-space margin setting, the conventional DMA controller of the above document requires that not only the input image data but also the editing control data be stored in the image memory before the execution of the image editing function.

In an image forming system having a plurality of image input/output devices, multiple image data input/output requests may occur in a concentrated manner. In such a case, it is desirable that the image forming system simultaneously perform multiple data transfer operations in parallel to meet the multiple image data input/output requests from the input/output devices, in order to make the total processing time as small as possible.

However, when the image editing function is executed by the image forming system using the conventional DMA controller, it is necessary that, during the data transfer performed for the execution of the image editing function, a large amount of the input data (not only image data but also the DMA control data) be retained in the image memory, which will increase the total image processing time. Especially when the image forming system is needed to perform the multiple data transfer operations in parallel, it is difficult that the image forming system using the conventional DMA controller to detect an appropriate start timing of the DMA data output operation after the image editing request, such as a margin setting request, is received with the input image data.

SUMMARY OF THE INVENTION

An object of the present invention is to provide an improved data processing apparatus in which the above-described problems are eliminated.

Another object of the present invention is to provide a data processing apparatus that reduces the amount of storage of input image data needed to be stored by the image memory, and quickly carries out the DMA data transfer at an appropriate timing when an image editing request is received with the input image data.

Another object of the present invention is to provide a DMA data transfer method for use in a data processing apparatus that reduces the amount of storage of input image data needed to be stored in the image memory, and quickly carries out the DMA data transfer at an appropriate timing when an image editing request is received with the input image data.

The above-mentioned objects of the present invention are achieved by a data processing apparatus including: an image memory which has a descriptor region and an image region, the image region storing a plurality of blocks of image data, the descriptor region storing a corresponding number of descriptor information blocks for the plurality of image data blocks, and a DMA controller which controls DMA data transfer of the image data blocks from the image region according to each descriptor information block in the descriptor region, the DMA controller comprising: a register which stores one of the descriptor information blocks from the descriptor region of the image memory; and a control unit which determines, at a time of occurrence of a CPU interrupt, a start timing of a DMA data output operation of the DMA controller during a DMA data input operation of the DMA controller when an image editing request contained in input image data is received, the CPU interrupt being caused to occur by an interrupt request bit of the descriptor information block read from the register.

The above-mentioned objects of the present invention are achieved by a DMA data transfer method for use in a data processing apparatus, the data processing apparatus including: an image memory which has a descriptor region and an image region, the image region storing a plurality of blocks of image data, the descriptor region storing a corresponding number of descriptor information blocks for the plurality of image data blocks; and a DMA controller which controls DMA data transfer of the image data blocks from the image region according to each descriptor information block in the descriptor region, the DMA data transfer method comprising the steps of: storing, in a register of the DMA controller, one of the descriptor information blocks from the descriptor region of the image memory; and determining, at a time of occurrence of a CPU interrupt, a start timing of a DMA data output operation of the DMA controller during a DMA data input operation of the DMA controller when an image editing request contained in input image data is received, the CPU interrupt being caused to occur by an interrupt request bit of the descriptor information block read from the register.

According to the data processing apparatus and the DMA data transfer method of the present invention, it is possible to detect an appropriate timing for performing the DMA data output operation to output the stored image data to the image memory after the image editing request is received for the input image data stored in the image memory. It is possible for the present invention to increase the efficiency of the image formation when executing the image editing function with the DMA controller and the image memory.

BRIEF DESCRIPTION OF THE DRAWINGS

Other objects, features and advantages of the present invention will be apparent from the following detailed description when read in conjunction with the accompanying drawings.

FIG. 3 is a block diagram of a storage section of the digital copier system in FIG. 1.

DETAILED DESCRIPTION OF PREFERRED EMBODIMENTS

A description will now be given of preferred embodiments of the present invention with reference to the accompanying drawings.

Figure 1:
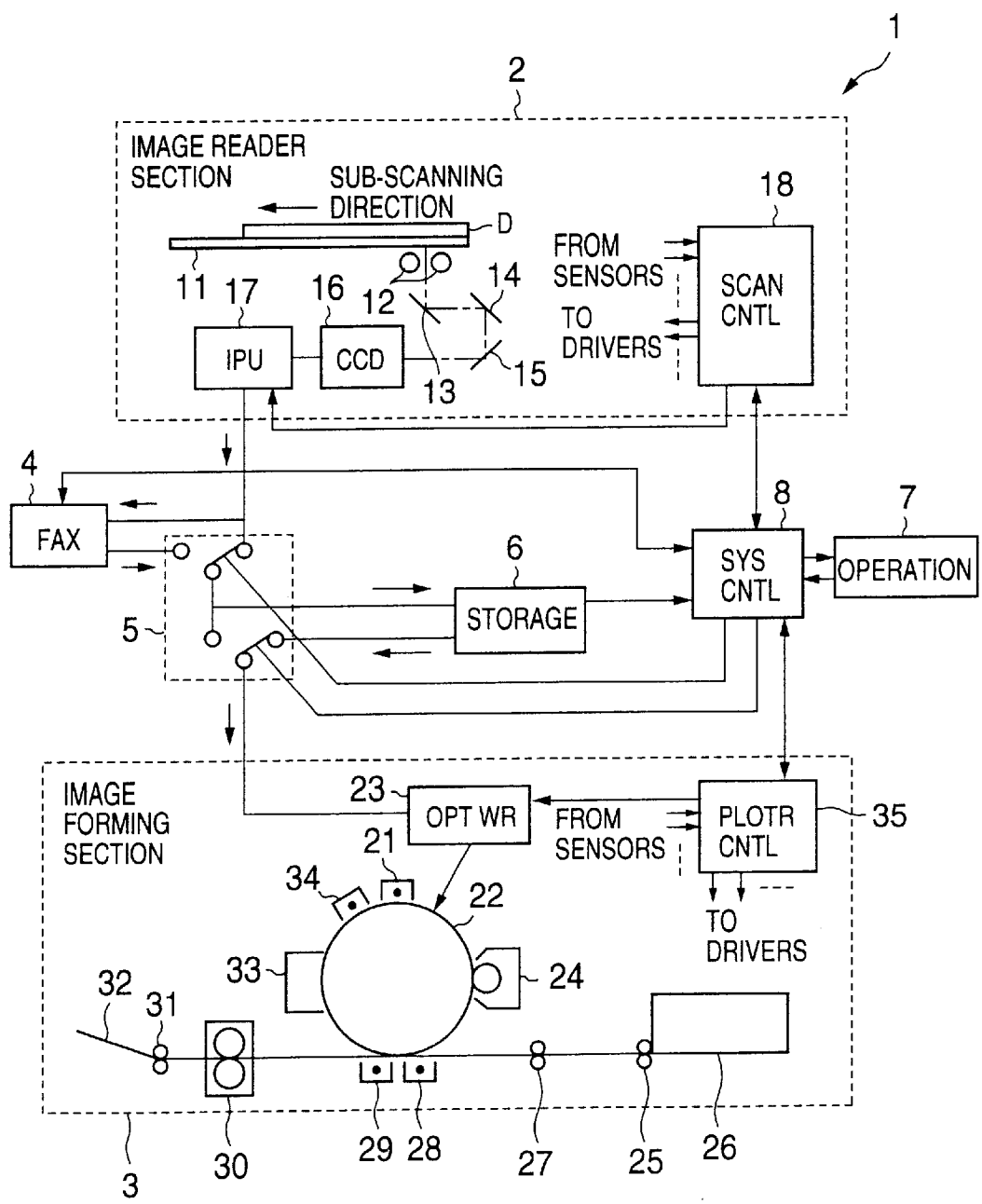
FIG. 1 is a block diagram of a digital copier system in which an embodiment of the data processing apparatus of the invention is provided.

FIG. 1 shows a digital copier system in which an embodiment of the data processing apparatus of the invention is provided.

As shown in FIG. 1, the digital copier system 1 generally includes an image reader section 2, an image forming section 3, a fax section (FAX) 4, a selector section 5, a storage section (STORAGE) 6, an operation section (OPERATION) 7, and a system control section (SYS CNTL) 8.

The image reader section 2 forms an image scanner that reads image data from a document D on a document base 11. In the image reader section 2, the document D is optically scanned by an exposure lamp 12 while the lamp 12 is moved along the document base 11. The reflection beam from the document D is received at a CCD image sensor 16 via optical systems including mirrors 13, 14 and 15. The CCD image sensor 16 optoelectrically produces an image signal, indicating the image data, from the received reflection beam.

In the image reader section 2, an image processing unit (IPU) 17 performs the shading correction process for the image signal output by the CCD image sensor 16, produces an 8-bit digital image signal through the analog-to-digital conversion of the shading-corrected image signal, and performs the scaling process, the dither processing and other image processing for the digital image signal. After the image processing is performed, the IPU 17 outputs the processed image signal together with image sync signals. In order to carry out the image processing at the IPU 17, a scanner control unit (SCAN CNTL) 18 receives detection signals from sensors of the digital copier system 1 and outputs control signals to driving motors and actuators of the digital copier system 1. In addition, the scanner control unit 18 sets control parameters of the IPU 17.

Figure 2A:
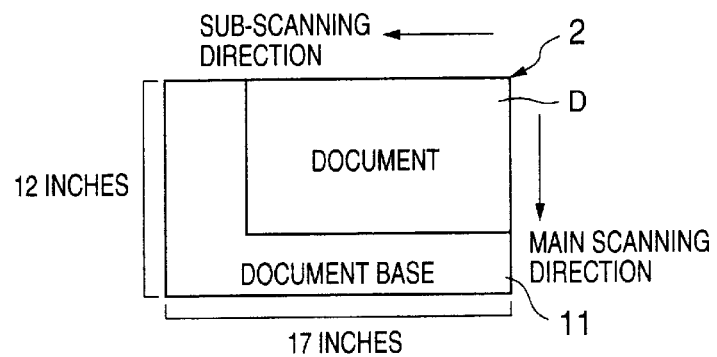
FIG. 2A is a diagram for explaining the relationship between a document and a document base in the digital copier system in FIG. 1.
Figure 2B:
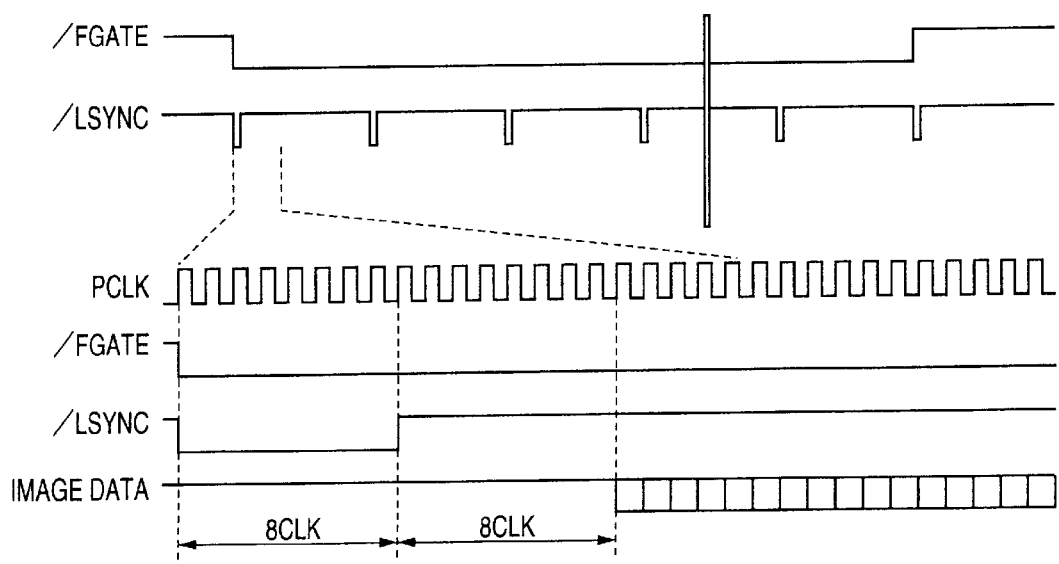
FIG. 2B is a timing chart for explaining image sync signals output by an image processing unit of the digital copier system in FIG. 1.

FIG. 2A shows the relationship between a document D and the document base 11 in the digital copier system in FIG. 1. FIG. 2B shows image sync signals output by the image processing unit IPU 17 of the digital copier system in FIG. 1.

In FIG. 2B, "/FGATE" is the frame gate signal that indicates an effective image region of the image data in the sub-scanning direction. When the signal "/FGATE" is set at the low level, the corresponding image data along the sub-scanning line is made effective. "/LSYNC" is the line sync signal. The signal "/FGATE" is asserted or negated at the time of a falling edge of the line sync signal "/LSYNC". "PCLK" is the pixel sync signal. The signal "/LSYNC" is asserted for a given number of clocks (e.g., 8 clocks) at the time of a rising edge of the pixel sync signal "PCLK". The corresponding image data in the main scanning direction is made effective after the given number of clocks (e.g., 8 clocks) since the occurrence of a rising edge of the signal "/LSYNC".

The incoming image data include pixels each of which corresponds to one period (e.g., 16 clocks) of the pixel sync signal "PCLK". The image data are the sequence of pixels arrayed at a resolution of 400 dpi along the sub-scanning line indicated by the arrow "Z" in FIG. 2A. The image data are output as the raster-format data having the starting point indicated by the arrow "Z". The effective range of image data in the sub-scanning direction is normally determined by the size of the copy sheet.

As shown in FIG. 1, the image forming section 3 is a printer engine that forms an output image. The system control section 8 stores the image data, produced by the image reader section 2, into the storage section 6, and causes the image forming section 3 to form the output image from the image data of the storage section 6. One embodiment of the data processing apparatus of the invention is applied to the storage section 6 in the digital copier system 1.

In the image forming section 3 in FIG. 1, an electrostatic charger 21 charges uniformly the surface of an electrostatic photoconductor 22. The photoconductor 22 is rotated at a constant rotation speed. During the rotation, the uniformly charged surface of the photoconductor 22 is exposed to an imaging pattern that is output by an optical writing unit (OPT WR) 23. In the optical writing unit 23, a laser light beam, emitted by the laser light source, is modulated in accordance with the image data supplied from the image reader section 2, so that the optical writing unit 23 outputs the imaging pattern to the photoconductor surface. As a result of the exposure, an electrostatic latent image is formed on the surface of the photoconductor 22. A developing unit 24 provides the surface of the photoconductor 22 with toner, so that the latent image on the photoconductor surface is converted into a toner image.

In the image forming section 3 in FIG. 1, a copy sheet from a paper-feed tray 26 is delivered by paper-feed rollers 25 to a waiting position where a registration roller 27 is provided. In a concerted manner with the rotation of the photoconductor 22, the registration roller 27 is controlled to deliver the copy sheet from the waiting position to an image transfer position between the photoconductor 22 and a transfer charger 28. The toner image on the photoconductor surface is transferred to the copy sheet by using the transfer charger 28. A separating charger 29 separates the copy sheet from the photoconductor 22. A fixing unit 30 supplies heat and pressure to the copy sheet sent from the separating charger 29, and the toner image is fixed onto the copy sheet. The copy sheet with the fixed image is delivered from the fixing unit 30 to an ejection tray 32 by ejection rollers 31.

Further, in the image forming section 3 in FIG. 1, a cleaning unit 33 removes the residual toner on the surface of the photoconductor 22 after the toner image is transferred to the copy sheet. An electrostatic discharger 34 removes the residual charge on the photoconductor surface. In order to carry out the image forming process in the image forming section 3, a plotter control unit (PLOTR CNTL) 35 receives detection signals from sensors of the digital copier system 1 and outputs control signals to driving motors and actuators of the digital copier system 1.

In the above-described embodiment, the image forming section 3 of the electro-photographic printing type is applied to the digital copier system 1. Alternatively, the image forming section of the ink-jet printing type may be applied to the digital copier system 1.

Further, in the digital copier system 1 in FIG. 1, the operation section 7 includes various control keys and a LCD (liquid crystal display) portion, receives input setting signals from the control keys when depressed by the operator, and outputs operational messages to the LCD portion that can be viewed by the operator. The system control section 8 includes a CPU and performs various data processing operations. The system control section 8 detects the input setting signals which are sent from the operation section 7 when any of the control keys is depressed by the operator. Based on the detected setting signals, the system control section 8 transmits control signals to the several sections including the image reader section 2, the image forming section 3, the fax section 4, the selector section 5 and the storage section 6, so that the system control section 8 sets various control parameters of the sections 2 to 6 and instructs the execution of the image forming processes of the sections 2 to 6.

Further, in the digital copier system 1 in FIG. 1, the fax section 4 performs the image compression of the image data from the image reader section 2 in accordance with the instructions sent by the system control section 8, to create a compressed fax image based on the G3 or G4 facsimile protocols. The fax section 4 transmits the fax image to a destination facsimile terminal via a telephone network. Further, the fax section 4 receives a compressed fax image sent by a source facsimile terminal via the telephone network, creates the decompressed image data from the received fax image, and sends the image data to the image forming section 3.

Further, in the digital copier system 1 in FIG. 1, the selector section 5 changes the states of the internal selectors thereof in accordance with the control signals sent by the system control section 8, and causes the image forming section 3 to receive, as the source image data for the image formation, any of the image data of the image reader section 2, the storage section 6 and the fax section 4 via the internal selectors.

Further, in the digital copier system 1 in FIG. 1, the storage section 6 primarily stores the image data of the original document D sent from the IPU 17. As a secondary function, the storage section 6 serves as the buffer memory that temporarily stores the bi-level image data sent from the fax section 4. In order to carry out the image data storage operation on the storage section 6, the system control section 8 sends the necessary control signals to the storage section 6. As described earlier, one embodiment of the data processing apparatus of the invention is applied to the storage section 6 in the digital copier system 1.

FIG. 3 shows a configuration of the storage section 6 of the digital copier system in FIG. 1.

As shown in FIG. 3, the storage section 6 includes an image input/output DMA controller (IMAGE IN/OUT DMAC) 41, a memory control unit (MEMORY CNTL) 42, an image memory 43, an image transfer DMA controller (IMAGE TRNSF DMAC) 44, a code transfer DMA controller (CODE TRNSF DMAC) 45, and a coder/decoder unit (CODEC) 46. In the present embodiment, the image input/output DMA controller 41 is called the DMAC 41, for the sake of convenience.

The DMAC 41 includes a CPU and a logic LSI, and performs communication with the memory control unit 42 to receive the command from the memory control unit 42 so that the DMAC 41 sets the operating parameters in response to the command. The DMAC 41 transmit a status signal to the memory control unit 42 to inform the memory control unit 42 of the current operating state of the DMAC 41. When the image input command from the memory control unit 42 is received, the DMAC 41 transmits the input image data (on the basis of 8 pixels) and the memory access signal to the memory control unit 42 in synchronism with the input pixel sync signal. When the image output command from the memory control unit 42 is received, the DMAC 41 outputs the output image data, sent from the memory control unit 42, in synchronism with the output image sync signal.

In the storage section 6 in FIG. 3, the image memory 43 stores the image data. The image memory 43 is constituted by a semiconductor memory device such as a DRAM. In the present embodiment, the storage capacity of the image memory 43 amounts to a sum of 4 Mbytes of image data corresponding to an A3-size image with 400-dpi resolution, and 4 Mbytes of image data for a storage area of the electronic sorting. The memory control unit 42 controls the image memory 43 only through the writing and reading commands.

The memory control unit 42 includes a CPU and a logic LSI, and performs communication with the system control section 8 to receive a command from the system control section 8 so that the memory control unit 42 sets the operating parameters in response to the command. The memory control unit 42 transmits a status signal to the system control section 8 to inform the system control section 8 of the current operating state of the storage section 6.

In the present embodiment, the major commands output by the system control unit 8 include the image input command, the image output command, the compression command, and the decompression command. The image input command and the image output command are transmitted to the image input/output DMAC 41 via the memory control unit 42. The compression command and the decompression command are transmitted to each of the image transfer DMAC 44, the code transfer DMAC 45 and the CODEC 46 via the image control unit 42.

Figure 4:
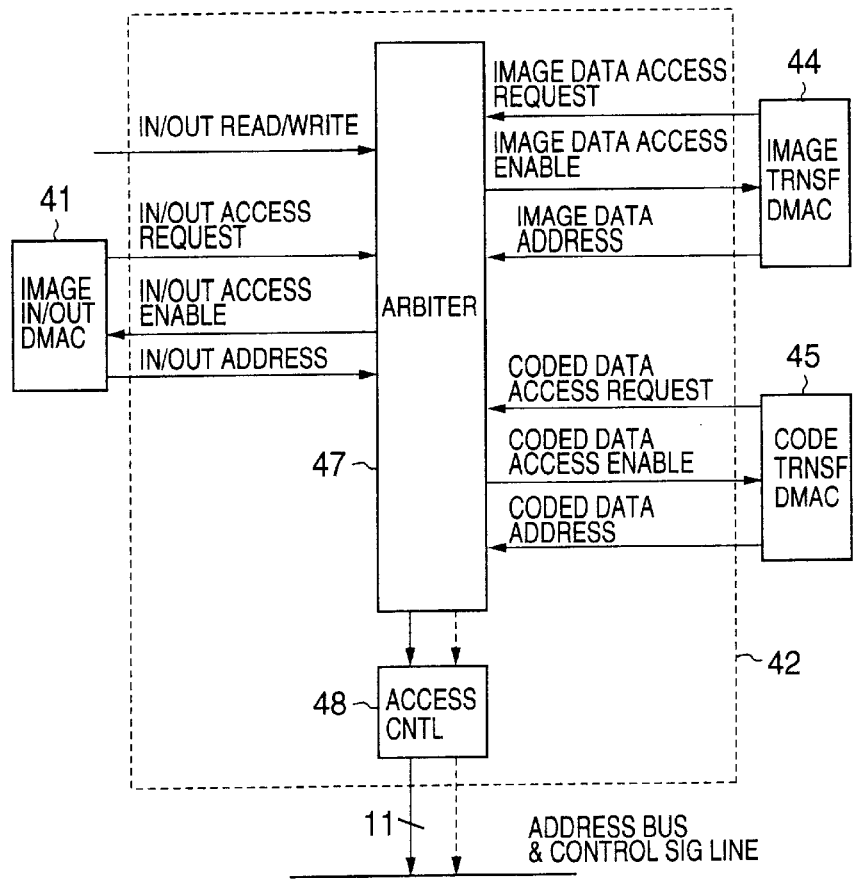
FIG. 4 is a block diagram of a memory control unit of the storage section in FIG. 3.

FIG. 4 shows a configuration of the memory control unit 42 of the storage section in FIG. 3.

As shown in FIG. 4, the memory control unit 42 includes an arbiter 47 and an access control circuit (ACCESS CNTL) 48. The arbiter 47 determines the priority sequence in which the access request signal of the DMAC 41, the access request signal of the image transfer DMAC 44 and the access request signal of the code transfer DMAC 45 are connected to the image memory 43 via the access control circuit 48. In response to each of the request signals, the arbiter 47 outputs the access enable signal to one of the DMAC 41, the image transfer DMAC 44 and the code transfer DMAC 45. The arbiter 47 includes a built-in refresh control circuit, and the priority order in the arbiter 47 is as follows: the refresh control circuit, the DMAC 41, the image transfer DMAC 44 and the code transfer DMAC 45. The arbiter 47 outputs the active-state memory access enable signal to the allowed circuit under the condition in which the memory access to the image memory 43 is made inactive. At the time of outputting of the memory access enable signal, the arbiter 47 selects the address of the image memory 43, and outputs the trigger signal to the access control circuit 48, the trigger signal indicating to the access control circuit 48 the start of the memory access.

The physical address input by the arbiter 47 is divided into the row address and the column address, which correspond to the memory address of the image memory 43 (DRAM), and the access control circuit 48 outputs such address signal to the image memory 43 via the 11-bit address bus. Further, when the access start signal from the arbiter 47 is received, the access control circuit 48 outputs the DRAM control signals (RAS, CAS, WE) to the image memory 43 via the control signal lines.

In the storage section 6 in FIG. 3, the image transfer DMAC 44 includes a CPU and a logic LSI. As shown in FIG. 3, the image transfer DMAC 44 performs communication with the memory control unit 42 to receive the command from the memory control unit 42 so that the DMAC 44 sets the operating parameters in response to the command. The DMAC 44 transmits a status signal to the memory control unit 42 to inform the memory control unit 42 of the current operating state of the DMAC 44. When the compression command is received, the DMAC 44 outputs the image data access request signal to the memory control unit 42. When the image data access enable signal sent from the memory control unit 42 is in the active state, the DMAC 44 receives the image data and transfers the image data to the CODEC 46. The DMAC 44 includes a built-in address counter that has the count value incremented when the image data access request signal is output, and outputs the 22-bit memory address signal indicating the memory location where the coded image data is stored.

The code transfer DMAC 45 includes a CPU and a logic LSI, and performs communication with the memory control unit 42 to receive the command from the memory control unit 42 so that the DMAC 45 sets the operating parameters in response to the command. The DMAC 45 transmits a status signal to the memory control unit 42 to inform the memory control unit 42 of the current operating state of the DMAC 45. When the decompression command is received, the DMAC 45 outputs the coded data access request signal to the memory control unit 42. When the coded data access enable signal sent from the memory control unit 42 is in the active state, the DMAC 45 receives the image data and transfers the image data to the CODEC 46. The DMAC 45 includes a built-in address counter that has the count value incremented when the coded data access request signal is output, and outputs the 22-bit memory address signal indicating the memory location where the image data is stored.

The CODEC 46 includes a CPU and a logic LSI, and performs communication with the memory control unit 42 to receive the command from the memory control unit 42 so that the CODEC 46 sets the operating parameters in response to the command. The CODEC 46 transmit a status signal to the memory control unit 42 to inform the memory control unit 42 of the current operating state of the CODEC 46. The CODEC 46 performs the encoding process for the bi-level image data by using the MH encoding method.

Figure 5:
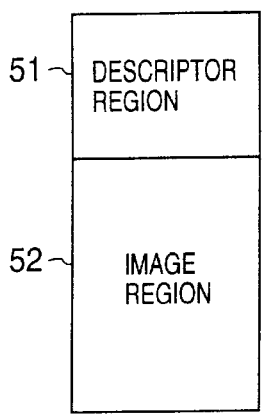
FIG. 5 is a diagram for explaining the structure of an image memory in the storage section in FIG. 3.

FIG. 5 shows the internal structure of the image memory 43 in the storage section in FIG. 3. As shown in FIG. 5, the image memory 43 is divided into a descriptor region 51 (which is also called a first storage unit) and an image region 52 (which is also called a second storage unit). The descriptor region 51 stores the descriptor information according to the invention (which will be described later), and the image region 52 stores the image data.

In the above-described storage section 6, the image input command or the image output command from the system control section 8 are received at the memory control unit 42, and the memory control unit 42 causes the DMAC 44 (or the DMAC 41) to read the image data from or write the image data to the specified region of the image memory 43 according to the received command. Further, in the above-described storage section 6, the DMAC 44 monitors the count value of the internal counter that indicates the number of data transfer lines related to the image data transferred. Hereinafter, the number of the data transfer lines is also called the data transfer line count or the data transfer word count.

Figure 6:
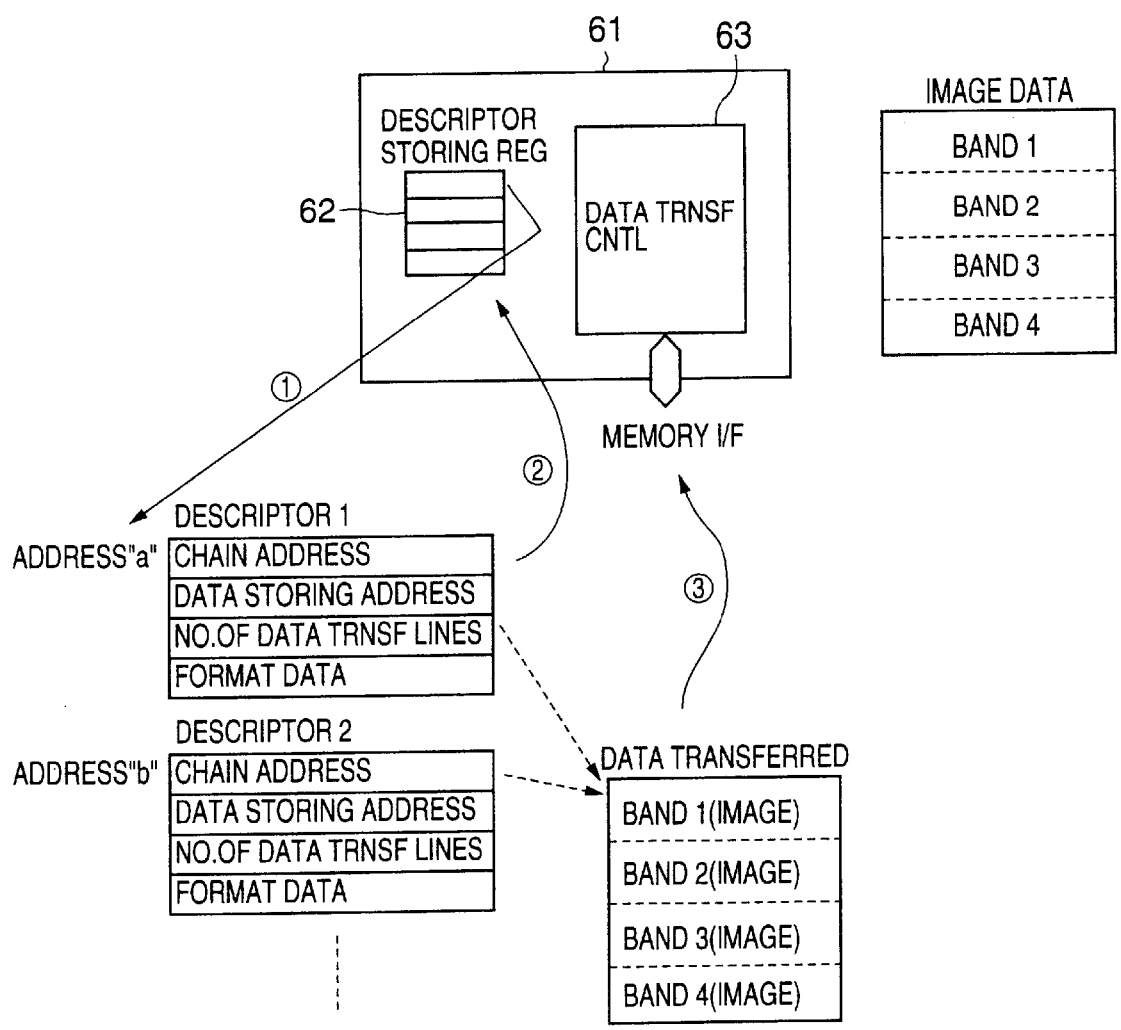
FIG. 6 is a diagram for explaining the flow of image data in a first preferred embodiment of the data processing apparatus of the invention.

FIG. 6 shows the flow of image data in a first preferred embodiment of the data processing apparatus of the invention.

Suppose that the image transfer DMAC 44 in the storage section 6 of the digital copier system 1 is provided by the DMAC 61 shown in FIG. 6. The descriptor information accessing and data transfer operations that are performed by the DMAC 61 of the present embodiment will now be described with reference to FIG. 6.

As shown in FIG. 6, the DMAC 61 of the present embodiment includes a descriptor storing register 62 and a data transfer controller 63. The data transfer controller 63 is constituted by a CPU and a logic circuit, similar to the DMAC 44 in the storage section 6 in FIG. 3. Also, as shown in FIG. 6, the image data is divided into four bands: band 1, band 2, band 3, and band 4. Alternatively, the image data bands may be called the image data blocks. The descriptor storing register 62 temporarily stores a corresponding one of the descriptor information blocks for one of the bands (or the blocks) of the image data. The number of data transfer lines (also called the data transfer line count or word count) is predetermined for each of the bands 1–4 of the image data.

In the data transfer controller 63, the total number of data transfer lines is determined by summing the data transfer line count of each band every time the data transfer of the band in the image data is performed.

When a transfer command (which is the image input command the image output command) is received at the DMAC 61, the DMAC 61 (or the CPU) reads a descriptor information block from the descriptor region 51 of the image memory at the address "a" (which is given as the initial chain address for the band 1 of the image data), and loads the descriptor information block ("descriptor 1") into the descriptor storing register 62. The descriptor information block, retained by the descriptor storing register 62, consists of four words: the chain address, the data storing address, the data transfer line count, and the format data, as indicated in FIG. 6. The chain address (or the first word stored in the register) indicates the descriptor storing address of the next descriptor. The data storing address (or the second word stored in the register) indicates the start address of the image region 52 of the image memory to which the image data is to be transferred. The data transfer line count (or the third word stored in the register) indicates the amount of the image data to be transferred to the image memory 43. The format data (or the final word stored in the register) indicates the format data used to control the delivery of the interrupt signal or other control signals to the CPU of the system control section 8.

In the present embodiment, the format data in the descriptor information block includes an interrupt request bit at the LSB (least significant bit) position of the final word. If the interrupt request bit of the format data is set to "0", the interrupt signal is delivered to the CPU of the system control section 8 to cause the CPU interrupt to occur at the end of the data transfer of the specified amount of image data (indicated by the data transfer line count). On the other hand, if the interrupt request bit of the format data is set to "1", the interrupt signal is not delivered to the CPU of the system control section 8 at the end of the data transfer of the specified amount of image data.

In the present embodiment, the descriptor storing register 62 retains both the data transfer line count and the format data related to the data transfer of one of the bands of the image data. When the interrupt request bits of the format data of the respective descriptors 1 through 4 are set to "0", the CPU interrupt is caused to occur at the DMAC 61 after the DMA data input operation for each of the bands is performed. In such a case, based on the descriptor information block retained in the register 62, the CPU interrupt is caused to occur after the DMA data input transfer of the specified amount of the image data (one of the four bands in the image data) is performed, and the DMAC 61 can appropriately determine the start timing of the DMA data output operation for the corresponding one of the four bands of the image data.

In the embodiment of FIG. 6, the image data is divided into the four bands, and the respective interrupt request bits of the format data of the descriptors 1 through 4 of the respective bands are set to "0". The CPU interrupt is caused to occur every time the DMA data input transfer of each band is performed. Hence, the DMAC 61 can appropriately determine the start timing of the DMA data output transfer of the corresponding one of the four bands of the image data, at the time of the CPU interrupt caused by the setting of the interrupt request bit of the format data of the descriptor information retained in the register 62. The DMAC 61 can detect the total line count that indicates the amount of the image data actually transferred to the image memory 43, by summing the data transfer line count of the descriptor information of each band.

As described earlier, when the image editing request (for example, a rear-end white-space margin setting request) is received at the DMAC 61 with the input image data containing the image editing request, it is necessary that the DMAC 61 detects an appropriate start timing of DMA data output operation of the storage section 6. In the present embodiment, the CPU interrupt is caused to occur by specifically setting the interrupt request bit of the descriptor information, and the DMAC 61 can appropriately determine the start timing of the DMA data output operation of the corresponding one of the bands of the image data.

Figure 7A:
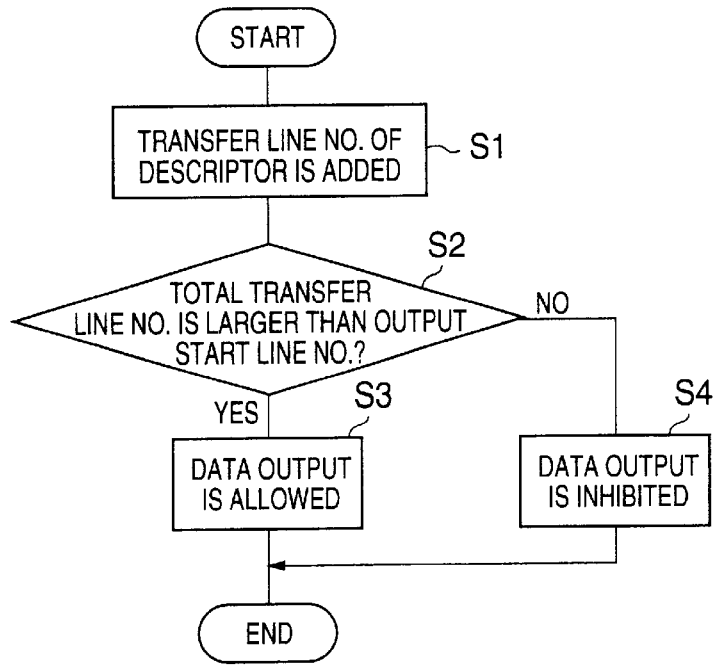
FIG. 7A is a flowchart for explaining detection of a start timing of the DMA data output operation of the data processing apparatus of the present embodiment.
Figure 7B:
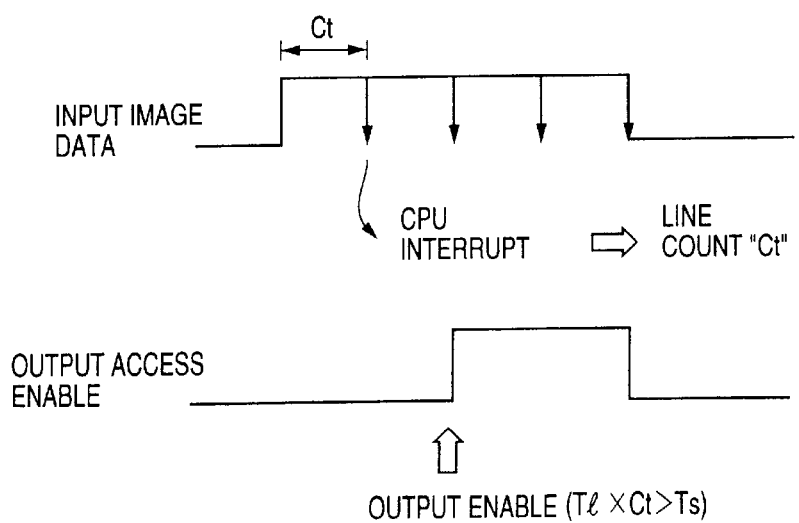
FIG. 7B is a timing chart for explaining the detection of the start timing of the DMA data output operation in FIG. 7A.

FIG. 7A shows the detection of a start timing of the DMA data output operation of the data processing apparatus of the present embodiment when the white-space margin setting request is received. FIG. 7B is a timing chart for explaining the detection of the start timing of the DMA data output operation in FIG. 7A.

As shown in FIG. 7B, the input image data is divided into the four bands, the data transfer line count (indicated by "Ct" in FIG. 7B) of the descriptor information of the first band is predetermined and retained in the register 62. Suppose that "Ts" indicates a given difference between the input data transfer speed and the output data transfer speed of the data processing apparatus (in the case of the storage section 6, the output data transfer speed>the input data transfer speed), and "Tl" indicates a given input data transfer speed needed per one line of the input data. The input/output data transfer speed difference "Ts" and the one-line input data transfer speed "Tl" are known.

After the input data transfer operation for one of the bands of the image data is performed, the output data transfer operation must be started. The CPU interrupt is caused to occur after the input data transfer operation for each band is performed, by specifically setting the interrupt request bit of the descriptor information. At the time of the CPU interrupt, the DMAC 61 detects the data transfer line count "Ct" of the descriptor information from the register 62, and determines whether the condition: Tl×Ct>Ts is met or not. If it is determined that the condition: Tl×Ct>Ts is not met at the time of the CPU interrupt after the end of the input data transfer operation for the first band, the determination as to whether the condition is met is repeated at the time of the CPU interrupt after the end of the input data transfer operation for each of the subsequent bands. If it is determined that the condition: Tl×Ct>Ts is met at the time of the CPU interrupt, the DMAC 61 sets, as shown in FIG. 7B, the output access enable signal at the high level so that the starting of the output data transfer operation is allowed. Hence, the DMAC 61 can appropriately determine the start timing of the DMA data output operation of the corresponding one of the bands of the image data.

The execution of the detection process to detect the start timing of the DMA data output operation shown in FIG. 7A is started by the data processing apparatus of the present embodiment (that is, the DMAC 61) at the time of the CPU interrupt. As shown in FIG. 7A, the DMAC 61 at step S1 reads the data transfer line count of the descriptor information from the register 62, and adds the data transfer line count to the total number of data transfer lines.

After the step S1 is performed, the DMAC 61 at step S2 determines whether the total data transfer count (obtained at the step S1) is larger than the output data transfer start line count that is determined based on the rear-end white-space margin setting request. When the result at the step S2 is affirmative, the DMAC 61 at step S3 allows the output data transfer operation to be performed. On the other hand, when the result at the step S2 is negative, the DMAC 61 at step S4 inhibits the output data transfer operation from being performed. After the step S3 or the step S4 is performed, the detection process in FIG. 7A ends, and the DMAC 61 is set in a waiting state until the next CPU interrupt occurs.

In the above-described embodiment, the input image data is divided into four bands. However, the data processing apparatus of the present invention is not limited to this embodiment. The number of the bands into which the input image data is divided may be set arbitrarily.

Figure 8:
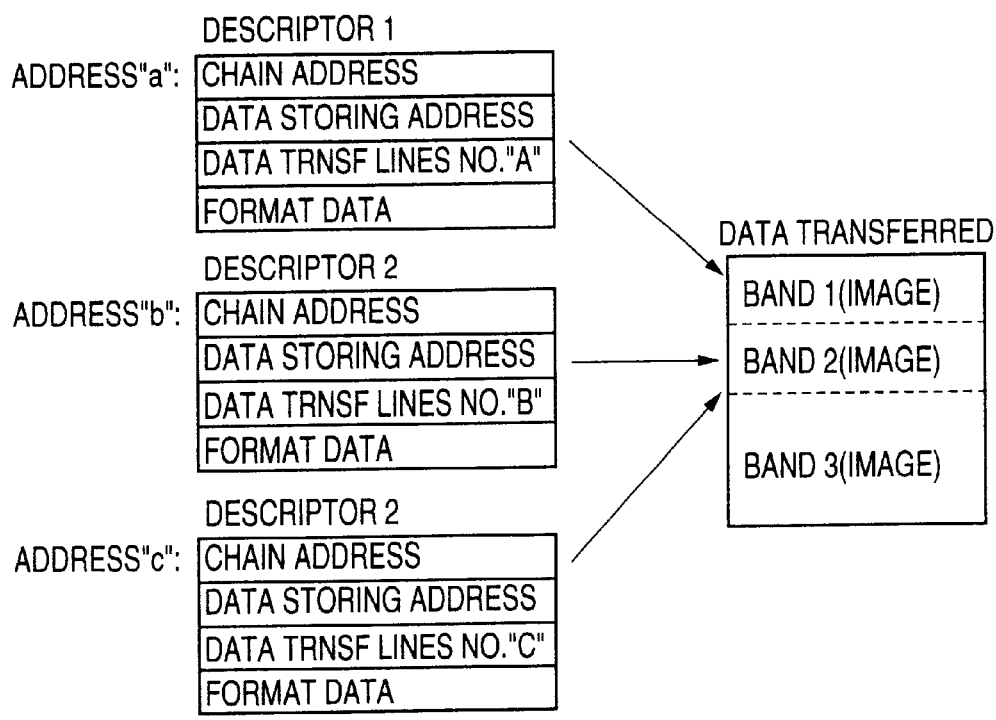
FIG. 8 is a diagram for explaining the structure of the descriptor information produced when the input image data is divided into three bands.

FIG. 8 shows the structure of the descriptor information produced when the input image data is divided into three bands.

As shown in FIG. 8, in the present embodiment, the image data is divided into three bands, and the data transfer line count "A" of the first band is set to 1 (A=1), the data transfer line count "B" of the second band is set to the maximum output data transfer start line count that is determined based on the margin setting request (in the present example, B=2), and the data transfer line count "C" of the final band is set to the remaining line count of the image data. The respective interrupt request bits of the format data of the descriptors 1 through 3 of the respective bands are set to "0". The descriptor information (the descriptors 1 through 3) is predetermined as indicated in FIG. 8.

The CPU interrupt is caused to occur every time the DMA data input transfer of each band is performed. Hence, the DMAC 61 can appropriately determine the start timing of the DMA data output transfer of the corresponding one of the three bands of the image data, at the time of the CPU interrupt caused by the setting of the interrupt request bit of the format data of the descriptor information retained in the register 62. The DMAC 61 can detect the total line count that indicates the amount of the image data actually transferred to the image memory 43, by summing the data transfer line count of the descriptor information of each band.

When the image editing request (for example, the rear-end white-space margin setting request) is received at the DMAC 61 with the input image data containing the image editing request, it is necessary that the DMAC 61 detect an appropriate start timing of DMA data output operation of the storage section 6. In the present embodiment, the CPU interrupt is caused to occur by specifically setting the interrupt request bit of the descriptor information, and the DMAC 61 can appropriately determine the start timing of the DMA data output operation of the corresponding one of the bands of the image data.

According to the data processing apparatus and the DMA data transfer method of the present embodiment, it is possible to detect an appropriate timing for starting the DMA data output operation to output the stored image data to the image memory after the image editing request is received with the input image data. It is possible for the present embodiment to increase the efficiency of the image formation when executing the image editing function with the DMA controller and the image memory.

In the above-described embodiment, the data processing apparatus of the present invention is applied to the digital copier system. However, the present invention is not limited to the above embodiment. Alternatively, the data processing apparatus of the present invention is also applicable to a facsimile, a printer, a scanner, a network file server or a digital complex type image forming system having a combination of such image forming functions.

Figures 9, 10:
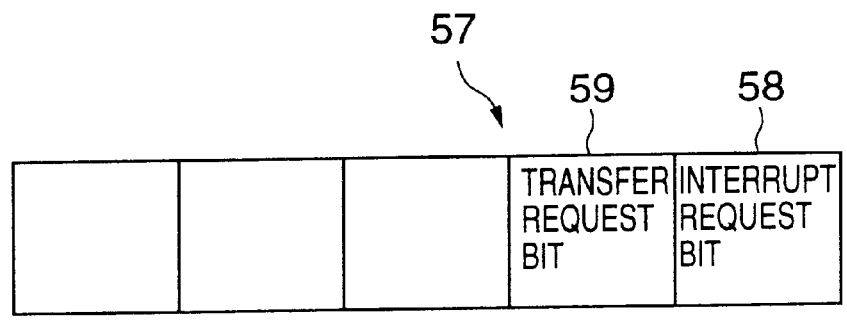
FIG. 9 is a diagram for explaining the structure of descriptor information stored in the image memory in a second preferred embodiment of the data processing apparatus of the invention.
FIG. 10 is a diagram for explaining the contents of format data in the descriptor information in the present embodiment.

Next, FIG. 9 shows the structure of descriptor information stored in the image memory in a second preferred embodiment of the data processing apparatus of the invention.

As shown in FIG. 9, each of the descriptor information blocks in the present embodiment consists of the four words: the chain address 54, the data storing address 55, the data transfer line count 56, and the format data 57, similar to that indicated in FIG. 6. Similar to the previous embodiment, the descriptor storing register 62 of the DMA controller 61 retains one of the descriptor information blocks from the descriptor region 51 of the image memory 43. The chain address 54 (or the first word stored in the register 62) indicates the descriptor storing address of the next descriptor information block. When there is no next descriptor information block, a numerical value, indicating the end of the descriptor information, is contained in the chain address 54 of the descriptor information block. The data storing address 55 (or the second word stored in the register 62) indicates the start address of the image region 52 of the image memory 43 to which the image data is to be transferred. The data transfer line count 56 (or the third word stored in the register 62) indicates the amount of the image data to be transferred to the image memory 43. The format data 57 (or the final word stored in the register 62) indicates the format data used to control the delivery of the interrupt signal or other control signals to the DMAC 61 (the CPU).

FIG. 10 shows the contents of the format data 57 in the descriptor information in the present embodiment. As shown in FIG. 10, in the present embodiment, the format data 57 in the descriptor information block includes an interrupt request bit 58 at the LSB (least significant bit) position of the format data 57, and a transfer request bit 59 at the second LSB position of the format data 57.

In the present embodiment, when the interrupt request bit 58 of the format data is set to "1", the interrupt signal is delivered to the CPU of the system control section 8 to cause the CPU interrupt to occur at the end of the data transfer of the specified amount of image data (indicated by the data transfer line count 56). On the other hand, when the interrupt request bit 58 of the format data is set to "0", the interrupt signal is not delivered to the CPU of the system control section 8 at the end of the data transfer of the specified amount of image data.

Further, in the present embodiment, when the transfer request bit 59 of the format data is set to "1", the DMA transfer request signal is delivered to the DMAC 41 to perform the DMA data transfer of the specified amount of image data (indicated by the data transfer line count 56). On the other hand, when the transfer request bit 59 of the format data is set to "0", the DMA transfer request signal is not delivered to the DMAC 41, and the specified amount of image data (indicated by the data transfer line count 56) is discarded without being transferred to the image memory 43.

Next, a description will be given of a DMA data transfer process performed by the data processing apparatus of the present embodiment with the input image data and the image memory 43. The input image data from the image reader section 2 is transferred into the image memory 43 through the execution of the DMA data transfer process.

Figure 11:
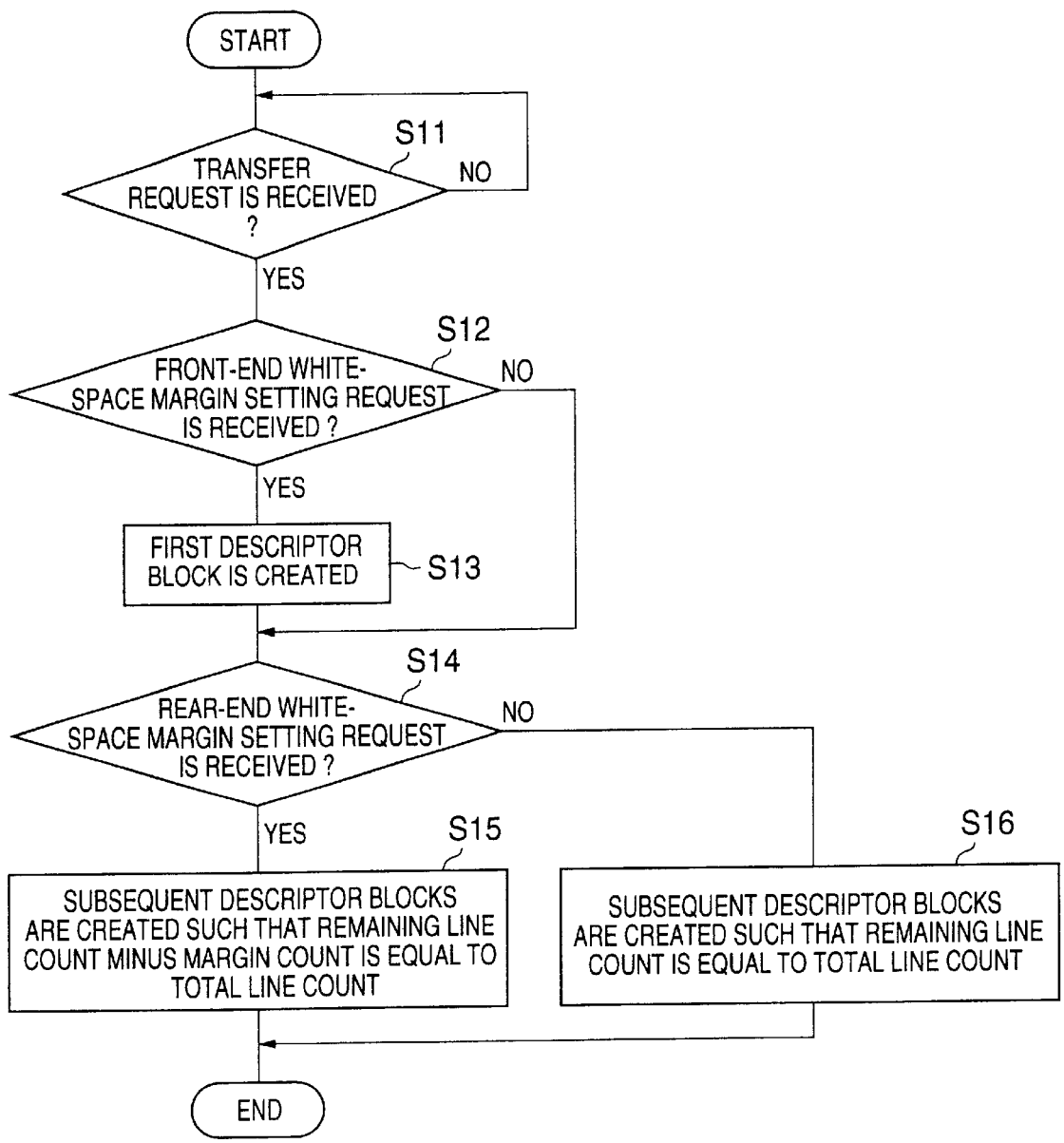
FIG. 11 is a flowchart for explaining a descriptor information generating process performed by the data processing apparatus of the present embodiment.

FIG. 11 shows a descriptor information generating process performed by the data processing apparatus of the present embodiment before performing the DMA data transfer process. In the present embodiment, the data processing apparatus of the present embodiment that performs the descriptor information generating process of FIG. 11 is embodied in the system control section 8. In the following description, the CPU of the system control section 8 that executes the descriptor information generating process of FIG. 11 is simply called the CPU, for the sake of convenience.

As shown in FIG. 11, the CPU at step S11 determines whether a transfer request from the image reader section 2 is received. When the result at the step S11 is negative, the control of the CPU is transferred to the step S11. When the result at the step S11 is affirmative, the control of the CPU is transferred to the next step S12. Namely, the execution of the descriptor information generating process of FIG. 11 is started upon receipt of the transfer request from the image reader section 2. A corresponding number of the descriptor information blocks for a plurality of blocks of the input image data are generated through the execution of the descriptor information generating process of FIG. 11. Suppose that the input image data from the image reader section 2 is divided into a plurality of blocks.

The CPU at step S12 determines whether a front-end white space margin setting request is received with the image data block of concern. The front-end white space margin setting request is provided to set a white space margin at the front end of the entire page for the image data line in the sub-scanning direction. When the result at the step S12 is affirmative, the CPU at step S13 creates the first descriptor information block among the plural descriptor information blocks such that the transfer request bit 59 of that block is set to "0" and the interrupt request bit 58 of that block is set to "1", so as to suit for the line count determined by the front-end white space margin setting request. On the other hand, when the result at the step S12 is negative, the step S13 is not performed and the next step S14 is performed.

The CPU at step S14 determines whether a rear-end white space margin setting request is received with the image data block of concern. The rear-end white space margin setting request is provided to set a white space margin at the rear end of the entire page for the image data line in the sub-scanning direction. When the result at the step S14 is affirmative, the CPU at step S15 creates the subsequent descriptor information blocks by setting the data transfer line count 56 of each block such that the line count of the remaining input image data minus the rear-end margin count is equal to the total line count of the image data to be stored into the image memory 43. Further, in the step S15, the CPU sets the transfer request bit 59 of the format data of each block to "1", and sets the interrupt request bit 58 of the format data of each block to "1".

On the other hand, when the result at the step S14 is negative, the CPU at step S16 creates the subsequent descriptor information blocks by setting the data transfer line count 56 of each block such that the line count of the remaining input image data is equal to the total line count of the image data to be stored into the image memory 43. Further, in the step S16, the CPU sets the transfer request bit 59 and the interrupt request bit 58 of the format data of each block in a similar manner to the step S15.

After the step S15 or the step S16 is performed, the CPU of the system control section 8 sends a DMA data transfer start signal to the memory control unit 42 of the storage section 6, and the descriptor information generating process of FIG. 11 ends.

Figure 12:
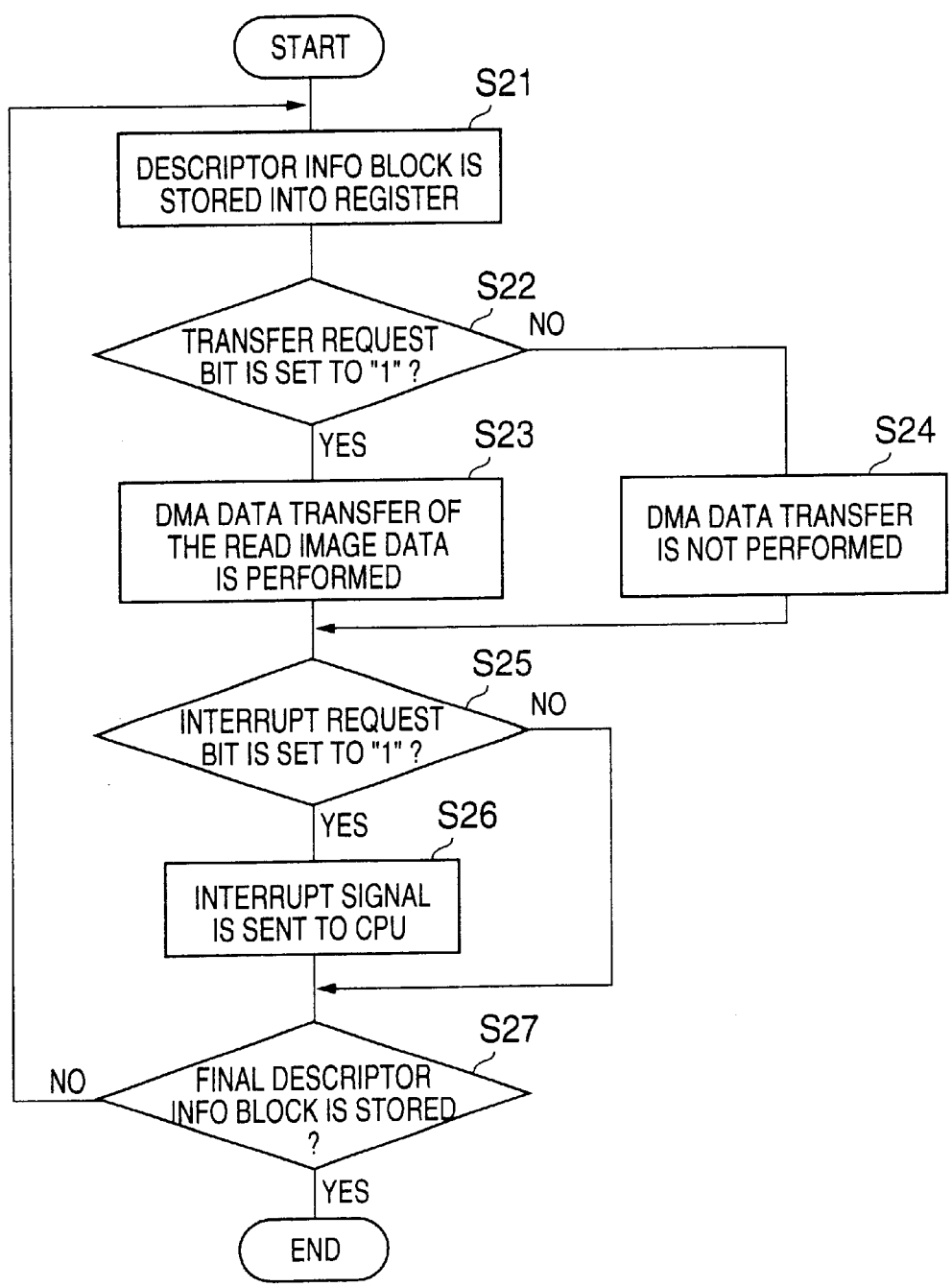
FIG. 12 is a flowchart for explaining a DMA data transfer process performed by the data processing apparatus of the present embodiment.

FIG. 12 shows a DMA data transfer process performed by the data processing apparatus of the present embodiment. When the DMA data transfer start signal from the system control section 8 is received at the memory control unit 42, the memory control unit 42 causes the image input/output DMAC 41 to start the execution of the DMA data transfer process of FIG. 12. In the present embodiment, the data processing apparatus of the present embodiment that performs the DMA data transfer process of FIG. 12 is embodied in the image input/output DMAC 41 of the storage section 6. In the following description, the CPU of the image input/output DMAC 41 that executes the DMA data transfer process of FIG. 12 is simply called the CPU, for the sake of convenience.

As shown in FIG. 12, the CPU at step S11 determines whether a transfer request from the image reader section 2 is received. When the result at the step S11 is negative, the control of the CPU is As shown in FIG. 12, the CPU at step S21 stores one of the descriptor information blocks from the descriptor region 51 of the image memory 43 into the descriptor storing register (which is the same as the element 62 in FIG. 6) of the DMAC 41.

After the step S21 is performed, the CPU at step S22 determines whether the transfer request bit 59 of the format data of the descriptor information block is set to "1". When the result at the step S22 is affirmative, the CPU at step S23 performs the DMA data transfer of the input image data block to the image region 52 of the image memory 43. When the result at the step S22 is negative, the CPU at step S24 does not perform the DMA data transfer and discards the input image data block of concern. In this case, the input image data block of concern is not stored in the image region 52 of the image memory 43.

After the step S23 or the step S24 is performed, the CPU at step S25 determines whether the interrupt request bit 58 of the format data of the descriptor information block is set to "1". When the result at the step S25 is affirmative, the CPU at step S26 sends the interrupt signal to the CPU of the system control section 8. Otherwise, the CPU does not perform the step S26, and the control of the CPU is transferred to the next step S27. The CPU at step S27 determines whether the final block among the descriptor information blocks from the descriptor region 51 of the image memory 43 is stored into the descriptor storing register. When the result at the step S27 is affirmative, the DMA data transfer process of FIG. 12 ends. Otherwise, the control of the CPU is transferred to the step S21 and the steps S21 to S27 are repeated.

Accordingly, when the image editing request, such as the white space margin setting request, is contained in the input image data, the data processing apparatus of the present embodiment stores only the image data blocks into the image memory and does not additionally store the image editing request into the image memory. It is possible for the present embodiment to save the amount of storage of the image memory and increase the efficiency of image formation when executing the image editing function with the DMA controller and the image memory.

In the above-described embodiment, when the transfer request bit of the format data of the descriptor information is set to "0", the input image data from the image reader section 2 is discarded. Alternatively, when the image editing function is performed after the input image data is stored in the image memory, the discarding of the input image data may be performed selectively according to the request of the operator.

In the above-described embodiment, when the interrupt request bit of the format data of the descriptor information is set to "1", the interrupt signal is sent to the CPU of the system control section 8. According to the data processing apparatus of the present embodiment, it is possible to detect an appropriate timing for the starting the DMA data output operation to output the stored image data to the image memory after the image editing request is received with the input image data, similar to the previous embodiment in FIG. 7A.

Figure 13:
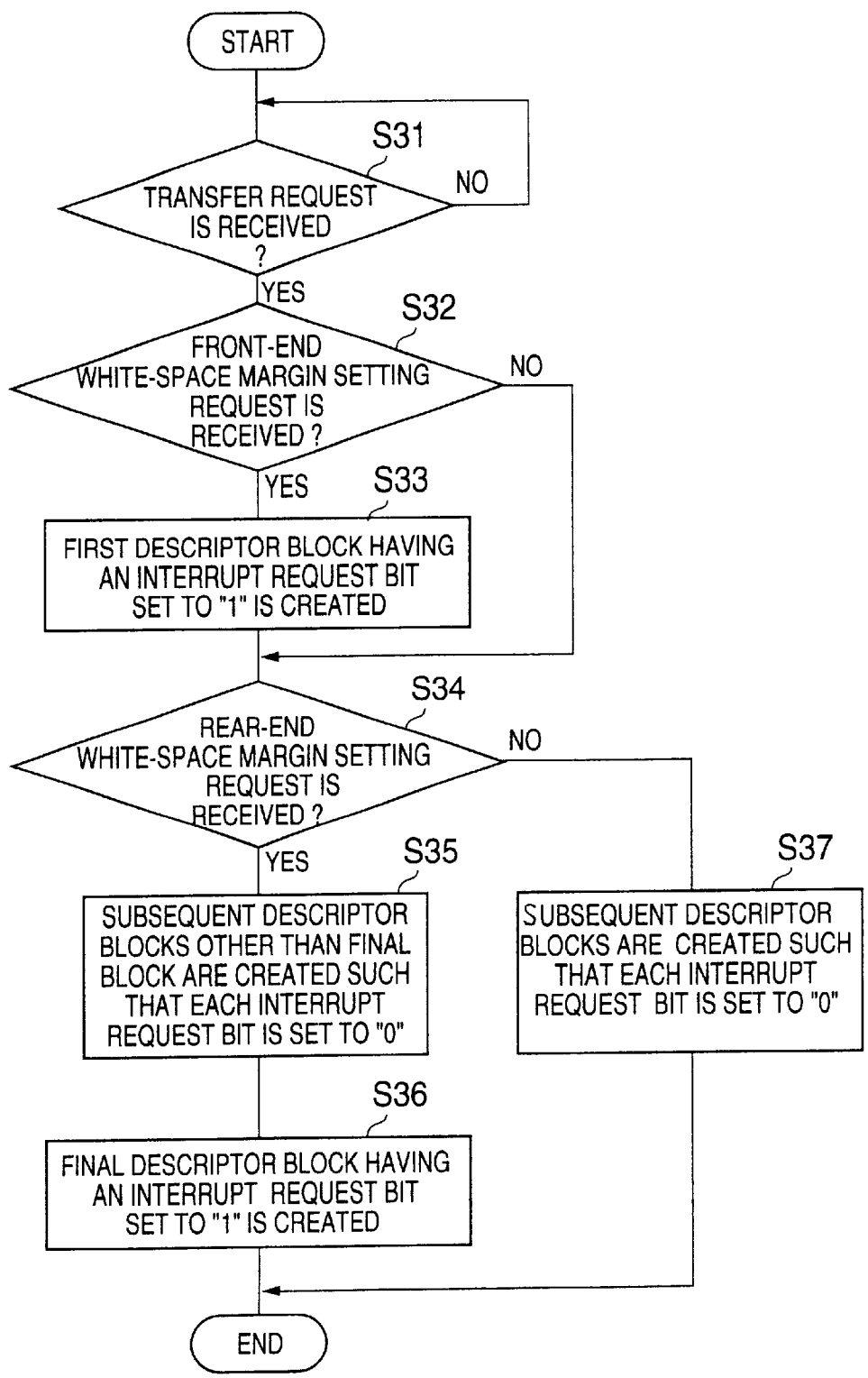
FIG. 13 is a flowchart for explaining a descriptor information generating process performed by a third preferred embodiment of the data processing apparatus of the invention.

Next, FIG. 13 shows a descriptor information generating process performed by a third preferred embodiment of the data processing apparatus of the invention.

Referring back to FIG. 10, in the present embodiment, when the interrupt request bit 58 of the format data is set to "1", the interrupt signal is delivered to the CPU of the system control section 8 to cause the CPU interrupt to occur at the end of the data transfer of the specified amount of image data (indicated by the data transfer line count 56). On the other hand, when the interrupt request bit 58 of the format data is set to "0", the interrupt signal is not delivered to the CPU of the system control section 8 at the end of the data transfer of the specified amount of image data.

Further, in the present embodiment, when the transfer request bit 59 of the format data is set to "0", the DMA transfer request signal is delivered to the DMAC 41 to perform the DMA data transfer of the specified amount of image data (indicated by the data transfer line count 56). On the other hand, when the transfer request bit 59 of the format data is set to "1", the DMA transfer request signal is not delivered to the DMAC 41, and the specified amount of white data (indicated by the data transfer line count 56) is instead delivered from the ROM of the DMAC 41 to the image memory 43.

The descriptor information generating process, shown in FIG. 13, is performed before performing the DMA data transfer process. In the present embodiment, the data processing apparatus of the present embodiment that performs the descriptor information generating process of FIG. 13 is embodied in the system control section 8. In the following description, the CPU of the system control section 8 that executes the descriptor information generating process of FIG. 13 is simply called the CPU, for the sake of convenience.

As shown in FIG. 13, the CPU at step S31 determines whether a transfer request from the image reader section 2 is received. When the result at the step S31 is negative, the control of the CPU is transferred to the step S31. When the result at the step S31 is affirmative, the control of the CPU is transferred to the next step S32. Namely, the execution of the descriptor information generating process of FIG. 13 is started by the CPU upon receipt of the transfer request from the image reader section 2. A corresponding number of the descriptor information blocks for a plurality of blocks of the input image data are generated through the execution of the descriptor information generating process of FIG. 13. Suppose that the input image data from the image reader section 2 is divided into a plurality of blocks.

The CPU at step S32 determines whether a front-end white space margin setting request is received with the image data block of concern. When the result at the step S32 is affirmative, the CPU at step S33 creates the first descriptor information block among the plural descriptor information blocks such that the transfer request bit 59 of that block is set to "1" and the interrupt request bit 58 of that block is set to "1", so as to suit for the line count determined by the front-end white space margin setting request. On the other hand, when the result at the step S32 is negative, the step S33 is not performed and the next step S34 is performed.

The CPU at step S34 determines whether a rear-end white space margin setting request is received with the image data block of concern. When the result at the step S34 is affirmative, the CPU at step S35 creates the subsequent descriptor information blocks, other than the final block, such that the transfer request bit 59 of the format data of each block is set to "0", and the interrupt request bit 58 of the format data of each block is set to "1". After the step S35 is performed, the CPU at step S36 creates the final block such that the data transfer line count of that block is suited for the line count determined by the rear-end white space margin setting request, the transfer request bit 59 of the format data of that block is set to "1", and the interrupt request bit 58 of the format data of that block is set to "1".

On the other hand, when the result at the step S44 is negative, the CPU at step S37 creates the subsequent descriptor information blocks such that the transfer request bit 59 of the format data of each block is set to "0", and the interrupt request bit 58 of the format data of each block is set to "1".

Figure 14:
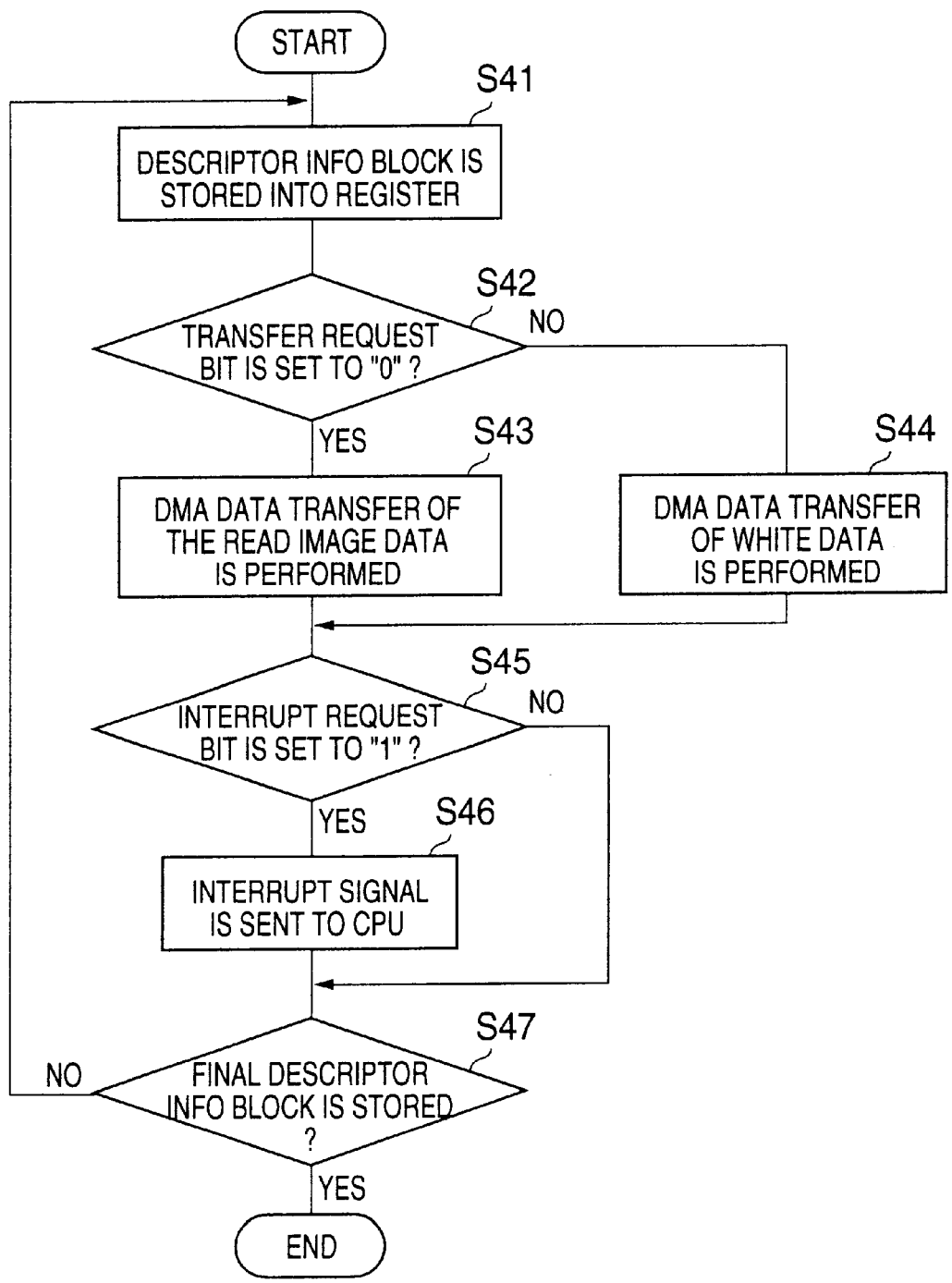
FIG. 14 is a flowchart for explaining a DMA data transfer process performed by the data processing apparatus of the present embodiment.

After the step S36 or the step S37 is performed, the CPU of the system control section 8 sends a DMA data transfer start signal to the memory control unit 42 of the storage section 6, and the descriptor information generating process of FIG. 14 ends.

FIG. 14 shows a DMA data transfer process performed by the data processing apparatus of the present embodiment. When the DMA data transfer start signal from the system control section 8 is received at the memory control unit 42, the memory control unit 42 causes the image input/output DMAC 41 to start the execution of the DMA data transfer process of FIG. 14. In the present embodiment, the data processing apparatus of the present embodiment that performs the DMA data transfer process of FIG. 14 is embodied in the image input/output DMAC 41 of the storage section 6. In the following description, the CPU of the image input/output DMAC 41 that executes the DMA data transfer process of FIG. 14 is simply called the CPU, for the sake of convenience.

As shown in FIG. 14, the CPU at step S41 stores one of the descriptor information blocks from the descriptor region 51 of the image memory 43 into the descriptor storing register (which is the same as the element 62 in FIG. 6) of the DMAC 41.

After the step S41 is performed, the CPU at step S42 determines whether the transfer request bit 59 of the format data of the descriptor information block is set to "0". When the result at the step S42 is affirmative, the CPU at step S43 performs the DMA data transfer of the input image data block to the image region 52 of the image memory 43. When the result at the step S42 is negative, the CPU at step S44 performs the DMA data transfer of the specified amount of white data from the ROM of the DMAC 41 to the image region 52 of the image memory 43. In this case, the input image data block of concern is not stored in the image region 52 of the image memory 43 but the white data is stored in the image region 52 of the image memory 43.

After the step S43 or the step S44 is performed, the CPU at step S45 determines whether the interrupt request bit 58 of the format data of the descriptor information block is set to "1". When the result at the step S45 is affirmative, the CPU at step S46 sends the interrupt signal to the CPU of the system control section 8. Otherwise, the CPU does not perform the step S46, and the control of the CPU is transferred to the next step S47. The CPU at step S47 determines whether the final block among the descriptor information blocks from the descriptor region 51 of the image memory 43 is stored into the descriptor storing register. When the result at the step S47 is affirmative, the DMA data transfer process of FIG. 14 ends. Otherwise, the control of the CPU is transferred to the step S41 and the steps S41 to S47 are repeated.

Accordingly, when the image editing request, such as the white space margin setting request, is contained in the input image data, the data processing apparatus of the present embodiment stores the image data blocks and the white data into the image memory and does not additionally store the image editing request into the image memory. It is possible for the present embodiment to save the amount of storage of the image memory and increase the efficiency of image formation when executing the image editing function with the DMA controller and the image memory.

In the above-described embodiment, when the transfer request bit of the format data of the descriptor information is set to "1", the white data from the DMAC 41 is stored into the image memory 43. Alternatively, when the transfer request bit of the format data of the descriptor information is set to "1", the discarding of the input image data may be performed selectively according to the request of the operator.

In the above-described embodiment, when the interrupt request bit of the format data of the descriptor information is set to "1", the interrupt signal is sent to the CPU of the system control section 8. According to the data processing apparatus of the present embodiment, it is possible to detect an appropriate timing for the starting the DMA data output operation to output the stored image data to the image memory after the image editing request is received with the input image data, similar to the previous embodiment in FIG. 7A.

The present invention is not limited to the above-described embodiments, and variations and modifications may be made without departing from the scope of the present invention.

Further, the present invention is based on Japanese priority application No. 2000-300622, filed on Sep. 29, 2000, Japanese priority application No. 2000-332035, filed on Oct. 31, 2000, and Japanese priority application No. 2000-332744, filed on Oct. 31, 2000, the entire contents of which are hereby incorporated by reference.

What is claimed is:

1. A data processing apparatus including:
an image memory having a descriptor region and an image region, the image region storing a plurality of blocks of image data, the descriptor region storing a corresponding number of descriptor information blocks for the plurality of image data blocks, and
a DMA controller controlling DMA data transfer of the image data blocks from the image region according to each descriptor information block in the descriptor region, the DMA controller comprising:
a register storing one of the descriptor information blocks from the descriptor region of the image memory; and
a control unit determining, at a time of occurrence of a CPU interrupt, a start timing of a DMA data output operation of the DMA controller during a DMA data input operation of the DMA controller when an image editing request contained in input image data is received, the CPU interrupt being caused to occur by an interrupt request bit of the descriptor information block read from the register.

2. The data processing apparatus according to claim 1, wherein the control unit comprises:
an addition unit reading a data transfer line count of one of the descriptor information blocks from the register, and adding the data transfer line to a total number of data transfer lines; and
a determination unit determining whether the total number produced by the addition unit is larger than an output data transfer start line count that is determined based on the image editing request.

3. The data processing apparatus according to claim 2, wherein the image editing request contained in the input image data is a white-space margin setting request.

4. The data processing apparatus according to claim 3, wherein the image data is divided into three blocks, and the descriptor information blocks includes a first block, a second block and a third block corresponding to the three image data blocks, respectively, the DMA controller setting a data transfer line count of the first block to 1, the DMA controller setting a data transfer line count of the second block to a maximum output data transfer start line that is determined based on the margin setting request, the DMA controller setting a data transfer line count of the third block to the remaining line count of the image data.

5. A DMA data transfer method for use in a data processing apparatus, the data processing apparatus including: an image memory having a descriptor region and an image region, the image region storing a plurality of blocks of image data, the descriptor region storing a corresponding number of descriptor information blocks for the plurality of image data blocks; and a DMA controller controlling DMA data transfer of the image data blocks from the image region according to each descriptor information block in the descriptor region, the DMA data transfer method comprising the steps of:
storing, in a register of the DMA controller, one of the descriptor information blocks from the descriptor region of the image memory; and
determining, at a time of occurrence of a CPU interrupt, a start timing of a DMA data output operation of the DMA controller during a DMA data input operation of the DMA controller when an image editing request contained in input image data is received, the CPU interrupt being caused to occur by an interrupt request bit of the descriptor information block read from the register.

6. A data processing apparatus including:
an image memory having a descriptor region and an image region, the image region storing a plurality of blocks of image data, the descriptor region storing a corresponding number of descriptor information blocks for the plurality of image data blocks, and
a DMA controller controlling DMA data transfer of the image data blocks from the image region according to each descriptor information block in the descriptor region, the DMA controller comprising:
a descriptor generating unit generating the descriptor information blocks such that a transfer request bit of each descriptor information block is set to one when requesting the DMA controller to perform the DMA data transfer of a specified amount of a corresponding image data block to the image memory, and the transfer request bit is set to zero when the specified amount of the corresponding image data block is discarded without performing the DMA data transfer.

7. The data processing apparatus according to claim 6, wherein, when generating the descriptor information blocks, the descriptor generating unit sets an interrupt request bit of each block to one when causing a CPU interrupt to occur at an end of the DMA data transfer of a corresponding image data block performed by the DMA controller, and sets the interrupt request bit of each block to zero when the CPU interrupt is not caused to occur at the end of the DMA data transfer of the corresponding image data block.

8. The data processing apparatus according to claim 6, wherein, when a front-end white space margin setting request is received, the descriptor generating unit creates a first block among the descriptor information blocks such that a transfer request bit of the first block is set to zero and an interrupt request bit of the first block is set to one, so as to suit for a line count determined by the front-end white space margin setting request.

9. The data processing apparatus according to claim 6, wherein the DMA controller comprises a register storing one of the descriptor information blocks from the descriptor region of the image memory.

10. A DMA data transfer method for use in a data processing apparatus, the data processing apparatus including: an image memory having a descriptor region and an image region, the image region storing a plurality of blocks of image data, the descriptor region storing a corresponding number of descriptor information blocks for the plurality of image data blocks; and a DMA controller controlling DMA data transfer of the image data blocks from the image region according to each descriptor information block in the descriptor region, the DMA data transfer method comprising the steps of:
storing, in a register of the DMA controller, one of the descriptor information blocks from the descriptor region of the image memory;
determining whether a transfer request bit of the descriptor information block stored in the register is set to one; and
performing the DMA data transfer of a corresponding image data block to the image region of the image memory when the transfer request bit is set to one, and, when the transfer request bit is set to zero, discarding the corresponding image data block without performing the DMA data transfer.

11. The DMA data transfer method according to claim 10, further comprising the steps of:
determining whether an interrupt request bit of the descriptor information block stored in the register is set to one; and
sending an interrupt signal to a CPU of an external control device only when the transfer request bit is set to one.

12. A data processing apparatus including:
an image memory having a descriptor region and an image region, the image region storing a plurality of blocks of image data, the descriptor region storing a corresponding number of descriptor information blocks for the plurality of image data blocks, and
a DMA controller controlling DMA data transfer of the image data blocks from the image region according to each descriptor information block in the descriptor region, the DMA controller comprising:
a descriptor generating unit generating the descriptor information blocks such that a transfer request,bit of each descriptor information block is set to zero when requesting the DMA controller to perform the DMA data transfer of a specified amount of a corresponding image data block to the image memory, and the transfer request bit is set to one when a specified amount of white data block is transferred from the DMA controller to the image region of the image memory.

13. The data processing apparatus according to claim 12, wherein, when generating the descriptor information blocks, the descriptor generating unit sets an interrupt request bit of each block to one when causing a CPU interrupt to occur at an end of the DMA data transfer of a corresponding image data block performed by the DMA controller, and sets the interrupt request bit of each block to zero when the CPU interrupt is not caused to occur at the end of the DMA data transfer of the corresponding image data block.

14. The data processing apparatus according to claim 12, wherein, when a front-end white space margin setting request is received, the descriptor generating unit creates a first block among the descriptor information blocks such that a transfer request bit of the first block is set to zero and an interrupt request bit of the first block is set to one, so as to suit for a line count determined by the front-end white space margin setting request.

15. The data processing apparatus according to claim 12, wherein the DMA controller comprises a register storing one of the descriptor information blocks from the descriptor region of the image memory.

16. A DMA data transfer method for use in a data processing apparatus, the data processing apparatus including: an image memory having a descriptor region and an image region, the image region storing a plurality of blocks of image data, the descriptor region storing a corresponding number of descriptor information blocks for the plurality of image data blocks; and a DMA controller controlling DMA data transfer of the image data blocks from the image region according to each descriptor information block in the descriptor region, the DMA data transfer method comprising the steps of:
storing, in a register of the DMA controller, one of the descriptor information blocks from the descriptor region of the image memory;
determining whether a transfer request bit of the descriptor information block stored in the register is set to zero; and
performing the DMA data transfer of a corresponding image data block to the image region of the image memory when the transfer request bit is set to zero, and, when the transfer request bit is set to one, performing the DMA data transfer of white data from the DMA controller to the image region of the image memory.

17. The DMA data transfer method according to claim 16, further comprising the steps of:
determining whether an interrupt request bit of the descriptor information block stored in the register is set to one; and
sending an interrupt signal to a CPU of an external control device only when the transfer request bit is set to one.

* * * * *